United States Patent

Ichimaru et al.

[11] Patent Number: 6,067,490
[45] Date of Patent: May 23, 2000

[54] SUSPENSION CONTROL APPARATUS UTILIZING A PWM TYPE PROPORTIONAL SOLENOID VALVE

[75] Inventors: Nobuyuki Ichimaru; Tohma Yamaguchi, both of Kanagawa-ken, Japan

[73] Assignee: Tokico, Ltd., Kanagawa-ken, Japan

[21] Appl. No.: 09/030,503

[22] Filed: Feb. 25, 1998

[30] Foreign Application Priority Data

Mar. 18, 1997 [JP] Japan ..................... 9-084512

[51] Int. Cl.$^7$ .................................. B60G 17/00
[52] U.S. Cl. ................ 701/37; 280/5.515; 188/266.2
[58] Field of Search .................... 701/37, 39; 280/5.515, 280/5.512, 5.5; 188/266.2, 266.1

[56] References Cited

U.S. PATENT DOCUMENTS 5,205,385  4/1993  Ashiba ..................... 188/299

Primary Examiner—Tan Nguyen
Attorney, Agent, or Firm—Wenderoth, Lind & Ponack, L.L.P.

[57] ABSTRACT

In the suspension control apparatus of the present invention utilizing a PWM type proportional solenoid valve, in which a current in a form such that a dithering current is superimposed on a target current is applied to a solenoid, when the average intensity of the applied current falls outside a predetermined range, a ratio between a time period during which the PWM signal having a decrease duty ratio is applied and a time period during which the PWM signal having an increase duty ratio is applied is changed so that an amplitude of the dithering current can be maintained at a predetermined level. Therefore, an undesirable increase in hysteresis with respect to a damping force can be suppressed, to thereby ensure good reponsivity for controlling a damping force, regardless of the average intensity of the applied current.

6 Claims, 9 Drawing Sheets

SUSPENSION CONTROL APPARATUS UTILIZING A PWM TYPE PROPORTIONAL SOLENOID VALVE

BACKGROUND OF THE INVENTION

The present invention relates to a suspension control apparatus utilizing a PWM type proportional solenoid valve, by use of which damping of vibration of a sprung mass is effected, to thereby improve ride quality in a vehicle.

As a conventional suspension control apparatus, there can be mentioned a suspension control apparatus proposed by the assignee of the present application in Unexamined Japanese Patent Application Public Disclosure (Kokai) No. 8-303628. The suspension control apparatus disclosed in Kokai No. 8-303628 comprises: a proportional solenoid valve having a movable member (spool) for controlling an amount of hydraulic fluid passing therethrough according to a position of the movable member, the movable member being adapted to be displaced according to an intensity of a current applied to a solenoid (hereinafter frequently referred to simply as "applied current" for the sake of convenience); a variable damping force generating shock absorber provided between a vehicle body and an axle to generate a damping force which varies depending on the intensity of the applied current, that is, depending on the position of the movable member; and a vehicle height sensor or an acceleration sensor. In this apparatus, the intensity of the applied current is determined, based on the detection value of the vehicle height sensor or of the acceleration sensor, to thereby generate a desired damping force (for an extension stroke and a compression stroke). Thus, damping of vibration of a sprung mass is effected, thereby improving ride quality in a vehicle.

In the above-mentioned suspension control apparatus, the applied current is obtained in a form such that an oscillating current (dithering current, which is hereinafter frequently referred to simply as "dither") is superimposed on a target current having a desired intensity (equal to an average intensity of the applied current) which is determined from the detection value of the vehicle height sensor or of the acceleration sensor. The dithering current is a high-frequency current which is obtained on the basis of a PWM (pulse width modulation) signal. Due to the dithering current, the movable member oscillates slightly (dithers) about a predetermined position corresponding to the intensity of the target current, so that displacement of the movable member can be easily performed, thereby improving responsivity in controlling a damping force. Illustratively stated, the dithering current is obtained by switching the duty ratio of the PWM signal between an increase duty ratio and a decrease duty ratio at predetermined time intervals $T_0$, each being equal to ½ of a cycle time of the dithering current. The term "increase duty ratio" herein means the duty ratio when the intensity of the applied current increases at each cycle of the PWM signal, and the term "decrease duty ratio" herein means the duty ratio when the intensity of the applied current decreases at each cycle of the PWM signal.

However, in the above-mentioned conventional suspension control apparatus, when the intensity of the target current (the average intensity of the applied current) falls below the lower limit of a predetermined range or exceeds the upper limit of the predetermined range, the amplitude of the dithering current (hereinafter, frequently referred to simply as "dither amplitude") becomes small, so that displacement of the movable member cannot be smoothly performed.

BRIEF SUMMARY OF THE INVENTION

In view of the above-mentioned situation, the present invention has been made. It is a primary object of the present invention to provide a suspension control apparatus utilizing a PWM type proportional solenoid valve, which is capable of substantially maintaining the amplitude of the dithering current at a predetermined level, regardless of the intensity of the target current (the average intensity of the applied current), so that an increase in hysteresis with respect to a relationship between a damping force and a target current can be suppressed, to thereby ensure good responsivity of the PWM type proportional solenoid valve.

According to the present invention, there is provided a suspension control apparatus comprising:

a proportional solenoid valve having a solenoid and a movable member, the movable member being adapted to be displaced according to an intensity of a current applied to the solenoid;

PWM signal generating means for generating a PWM signal having a variable duty ratio, the PWM signal being adapted to be switched between two duty ratios, the PWM signal having one of the two duty ratios and the PWM signal having the other duty ratio being applied during respective predetermined time periods, to thereby obtain a dithering current to be superimposed on a predetermined target current, the dithering current and the target current constituting the current applied to the solenoid; and switching means provided between a power source and the solenoid to be switched on and off according to the PWM signal.

The PWM signal generating means includes means for changing the ratio between the time period during which the PWM signal having one of the two duty ratios is applied and the time period during which the PWM signal having the other duty ratio is applied, in a manner such that an amplitude of the dithering current is substantially maintained at a predetermined level.

The foregoing and other objects, features and advantages of the present invention will be apparent from the following detailed description and appended claims taken in connection with the accompanying drawings.

DETAILED DESCRIPTION OF THE INVENTION

Before explaining an embodiment of the present invention, explanation is made below on a method which is generally employed for calculating the above-mentioned increase and decrease duty ratios of the PWM signal, with reference to FIG. 10 and FIG. 11.

Figure 10:
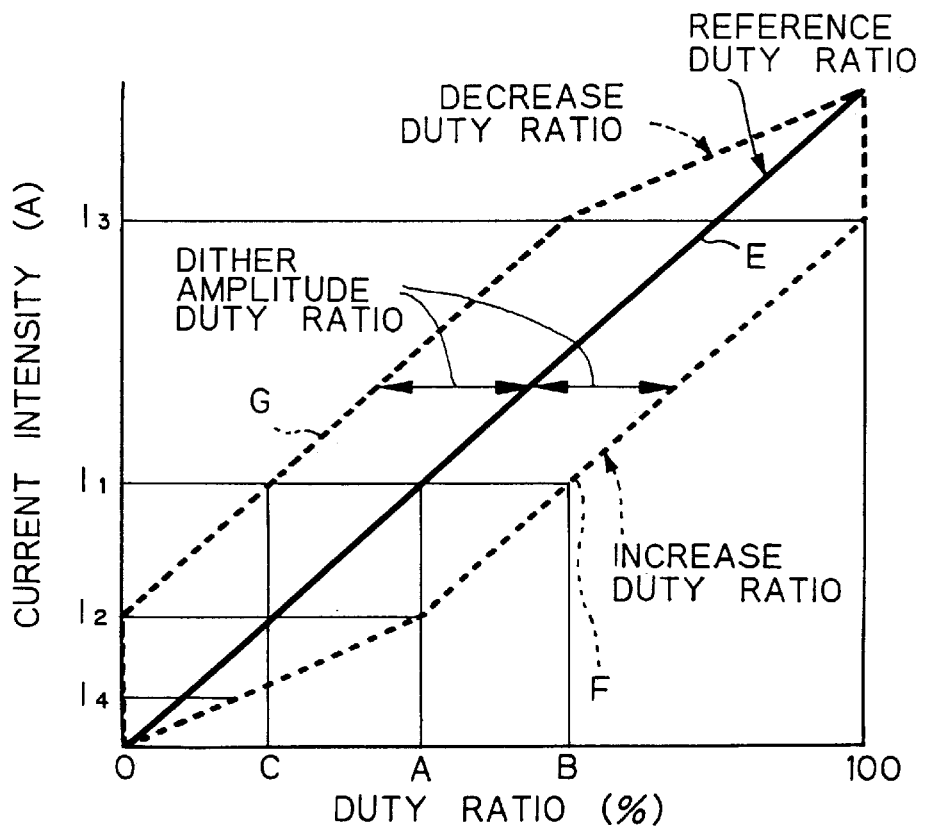
FIG. 10 is a graph showing PWM duty ratio characteristics relative to a current intensity in a conventional suspension control apparatus.
Figure 11:
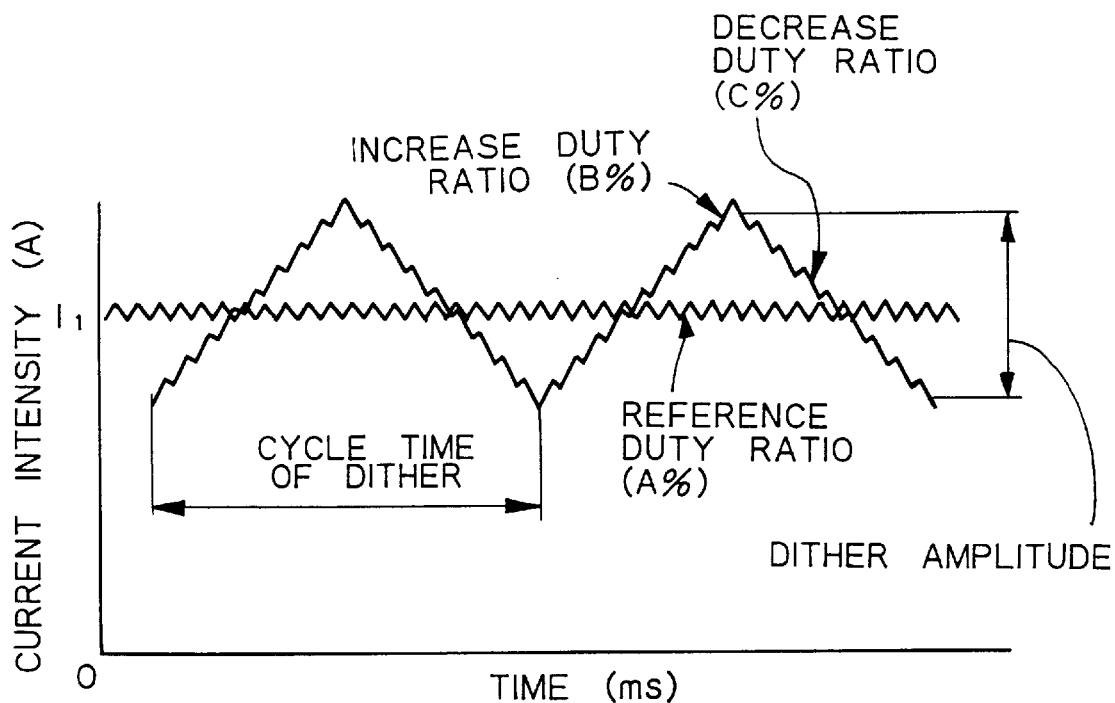
FIG. 11 is a graph showing the waveform of an applied current including a dithering current, which is obtained by a conventional suspension control apparatus.

FIG. 10 is a map showing PWM duty ratio characteristics relative to a current intensity (a PWM duty ratio—current intensity map), which is stored in a memory in a conventional suspension control apparatus. In FIG. 10, the abscissa indicates the PWM duty ratio and the ordinate indicates the current intensity. Reference character E denotes a reference duty ratio characteristic line showing a relationship between a reference duty ratio and the current intensity (for example, when the current intensity is $I_1$, the reference duty ratio is A %). The term "reference duty ratio" herein means a duty ratio of the PWM signal which does not produce a dithering current. When a dithering current is superimposed on a target current having a desired intensity $I_1$, to thereby obtain a current to be applied to the solenoid, the obtained current has a waveform as shown in FIG. 11, such that a high-frequency component is superimposed on a current having a predetermined intensity $I_1$, which is equal to an average intensity of the obtained current. The obtained current is applied to the solenoid, to thereby generate a desired damping force.

In FIG. 10, reference characters F and G denote an increase duty ratio characteristic line and a decrease duty ratio characteristic line which show a relationship between the increase duty ratio and the current intensity and a relationship between the decrease duty ratio and the current intensity, respectively. The increase duty ratio characteristic line F appears below the reference duty ratio characteristic line E in the form of a line substantially parallel to the reference duty ratio characteristic line E. The decrease duty ratio characteristic line G appears above the reference duty ratio characteristic line E in the form of a line substantially parallel to the reference duty ratio characteristic line E.

The maximum increase duty ratio is 100%. In FIG. 10, the increase duty ratio reaches 100% when the current intensity is $I_3$ ($I_3 > I_1$) When the current intensity is more than $I_3$, the increase duty ratio remains 100%, so that the increase duty ratio characteristic line F becomes parallel to the ordinate. On the other hand, the minimum decrease duty ratio is 0%. In FIG. 10, the decrease duty ratio reaches 0% when the current intensity is $I_2$ ($I_2 < I_1$). When the current intensity is less than $I_2$, the decrease duty ratio remains 0%, so that the decrease duty ratio characteristic line G becomes parallel to the ordinate.

The increase duty ratio and the decrease duty ratio are, respectively, determined by adding a dither amplitude duty ratio to the reference duty ratio and subtracting the dither amplitude duty ratio from the reference duty ratio, as indicated by the following formulae (1) and (2).

(increase duty ratio)=(reference duty ratio)+(dither amplitude duty ratio)  (1)

(decrease duty ratio)=(reference duty ratio)−(dither amplitude duty ratio)  (2)

As is apparent from the formulae (1) and (2), when the dither amplitude duty ratio changes, the increase duty ratio and decrease duty ratio also change. Therefore, when the dither amplitude duty ratio changes, the dither amplitude, which is determined from the increase and decrease duty ratios, also changes.

In order to obtain a current (to be applied to the solenoid) having an average intensity of, for example, $I_1$, a reference duty ratio A % is determined from the above-mentioned PWM duty ratio—current intensity map of FIG. 10. An increase duty ratio B % is determined by adding a dither amplitude duty ratio to the reference duty ratio A %, and a decrease duty ratio C % is determined by subtracting the dither amplitude duty ratio from the reference duty ratio A %. Subsequently, a PWM signal having the increase duty ratio is outputted during a predetermined time period (equal to ½ of a cycle time of a dither) $T_0$, and then, a PWM signal having the decrease duty ratio is outputted during the same predetermined time period. Thereafter, the PWM signal having the increase duty ratio and the PWM signal having the decrease duty ratio are alternately outputted in the same manner as mentioned above, to thereby obtain a current (to be applied to the solenoid) having a waveform as shown in FIG. 11, which includes a dither having an amplitude determined by the increase duty ratio and decrease duty ratio and having a cycle time equal to twice the above-mentioned predetermined time period $T_0$.

Figure 12:
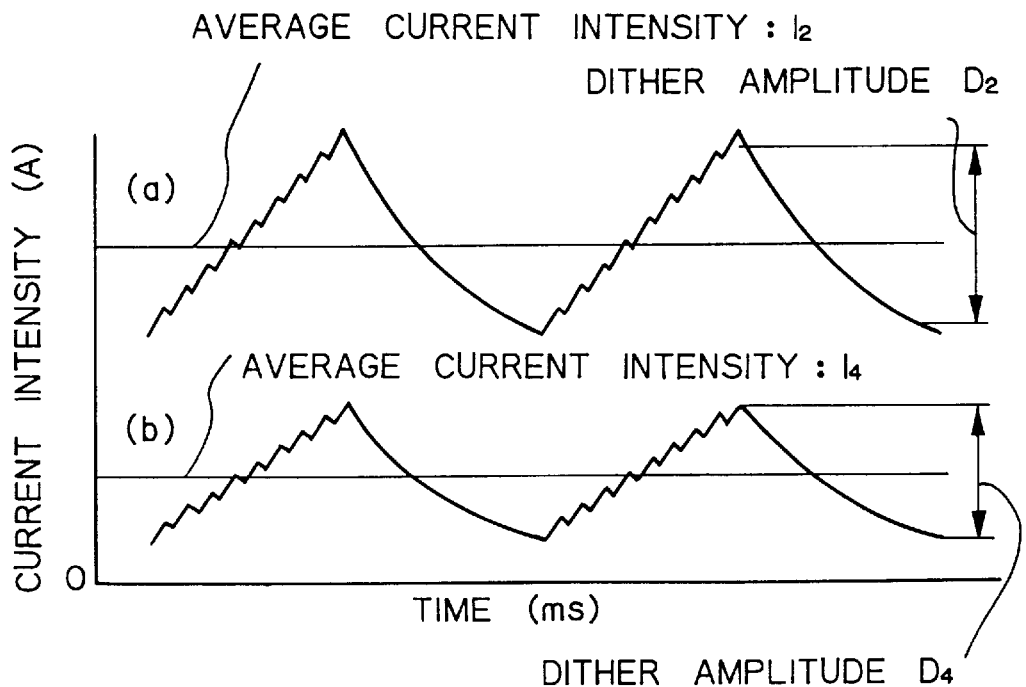
FIG. 12 is a graph showing how the dither amplitude becomes small when the average intensity of the applied current becomes low in a conventional suspension control apparatus.

In suspension control apparatuses, it is desired to maintain the dither amplitude at a predetermined level, regardless of the average intensity of the applied current. However, in the above-mentioned conventional suspension control apparatus, when the average intensity of the applied current falls below $I_2$ (for example, when the average intensity of the applied current becomes $I_4$), because the decrease duty ratio remains 0%, the dither amplitude duty ratio inevitably becomes small. Consequently, as is apparent from the formulae (1) and (2), the increase duty ratio (obtained by adding the dither amplitude duty ratio to the reference duty ratio) becomes small and the decrease duty ratio (obtained by subtracting the dither amplitude duty ratio from the reference duty ratio) becomes large. In this case, the applied current having the average intensity $I_4$ has a form indicated by, for example, a current waveform (b) shown in a graph of FIG. 12. A current waveform (a) in the graph of FIG. 12 represents a current (to be applied to the solenoid) having an average intensity $I_2$. As shown in FIG. 12, the dither amplitude $D_4$ of the applied current having the average intensity $I_4$ is smaller that the dither amplitude $D_2$ of the applied current having the average intensity $I_2$ ($D_4 < D_2$).

Figure 13:
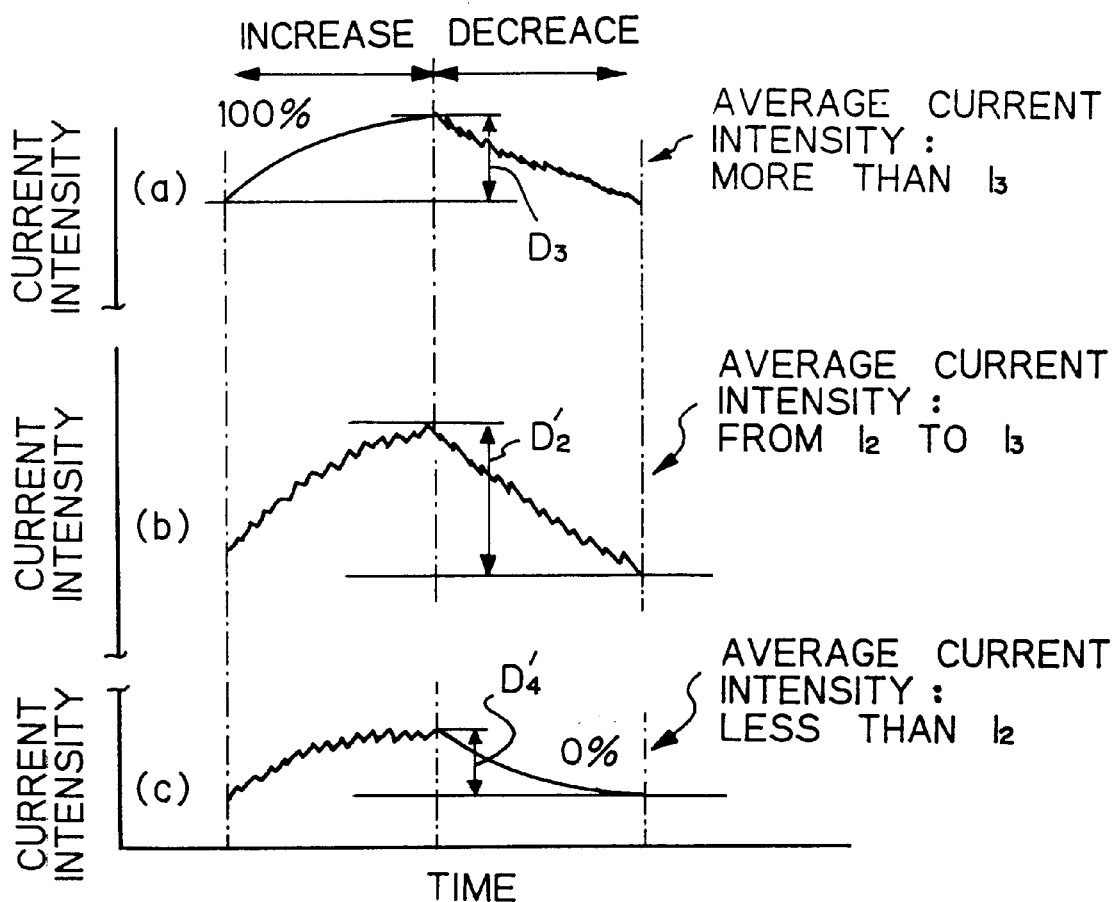
FIG. 13 is a graph showing how the dither amplitude becomes small when the average intensity of the applied current becomes low and when the average intensity of the applied current becomes high in a conventional suspension control apparatus.

FIG. 13 is a graph explaining how the dither amplitude varies depending on the average intensity of the applied current. When the average intensity of the applied current is less than $I_2$, the applied current has a form indicated by a current waveform (c) having a dither amplitude $D_4'$. When the average intensity of the applied current is in a range of from $I_2$ to $I_3$, the applied current has a form indicated by a current waveform (b) having a dither amplitude $D_2'$. As shown in FIG. 13, the dither amplitude $D_4'$ is smaller than the dither amplitude $D_2'$ ($D_4'<D_2'$). When the average intensity of the applied current is more than $I_3$, the applied current has a form indicated by a current waveform (a) having a dither amplitude $D_3$. As shown in FIG. 13, the dither amplitude $D_3$ is smaller than the dither amplitude $D_2'$ ($D_3<D_2'$).

Thus, in the conventional suspension control apparatus, when the average intensity of the applied current falls below the lower limit of a predetermined range or exceeds the upper limit of the predetermined range, the dither amplitude becomes small. This causes a problem such that displacement of the movable member cannot smoothly performed, so that an increase in hysteresis with respect to a damping force occurs and hence, responsivity for controlling a damping force becomes poor.

The meaning of "hysteresis with respect to a damping force" is as follows. Hysteresis with respect to a damping force describes a phenomenon whereby to obtain an equal change in damping force when increasing or decreasing a damping force, different current intensities are required to be applied to the solenoid. Therefore, in a graph showing a damping force—current intensity relationship, in which the abscissa indicates the current intensity and the ordinate indicates the damping force, a closed curve (hysteresis loop) substantially in the form of a parallelogram is obtained. It is preferred that the size of the hysteresis loop (a difference between a current intensity required for increasing a damping force to obtain a predetermined amount of change in damping force and a current intensity required for decreasing a damping force to obtain the same predetermined amount of change in damping force) be suppressed to as low a level as possible.

Figure 1:
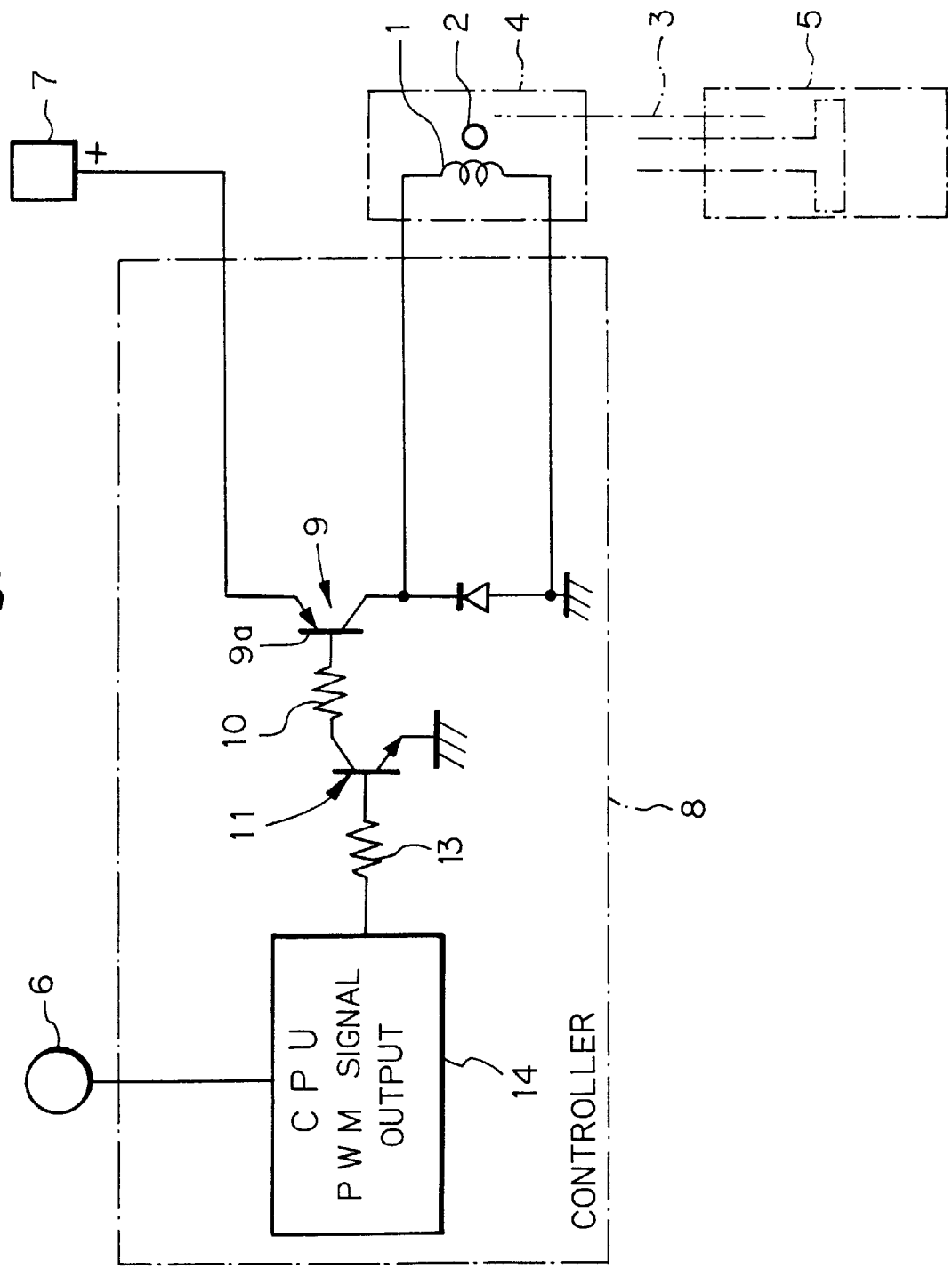
FIG. 1 shows a typical example of a suspension control apparatus according to one embodiment of the present invention.

Hereinbelow, a suspension control apparatus according to one embodiment of the present invention is described, with reference to FIGS. 1 to 9. As shown in FIG. 1, the suspension control apparatus mainly comprises: a proportional solenoid valve (actuator) 4 having a solenoid 1 and a plunger (movable member) 2 for controlling an amount of a hydraulic fluid 3 passing therethrough according to a position of the plunger 2, the plunger 2 being adapted to be displaced according to an intensity of a current applied to the solenoid 1; a variable damping force generating shock absorber 5 provided between a vehicle body (not shown) and an axle (not shown) to generate a damping force which varies depending on the intensity of the current applied to the solenoid 1, that is, depending on the position of the plunger 2; an acceleration sensor 6 for detecting an acceleration of the vehicle body in a vertical direction; a battery (power source) 7 for applying the current to the solenoid 1; and a controller 8 provided between the battery 7 and the solenoid 1 to control the current applied to the solenoid 1.

Figure 2:
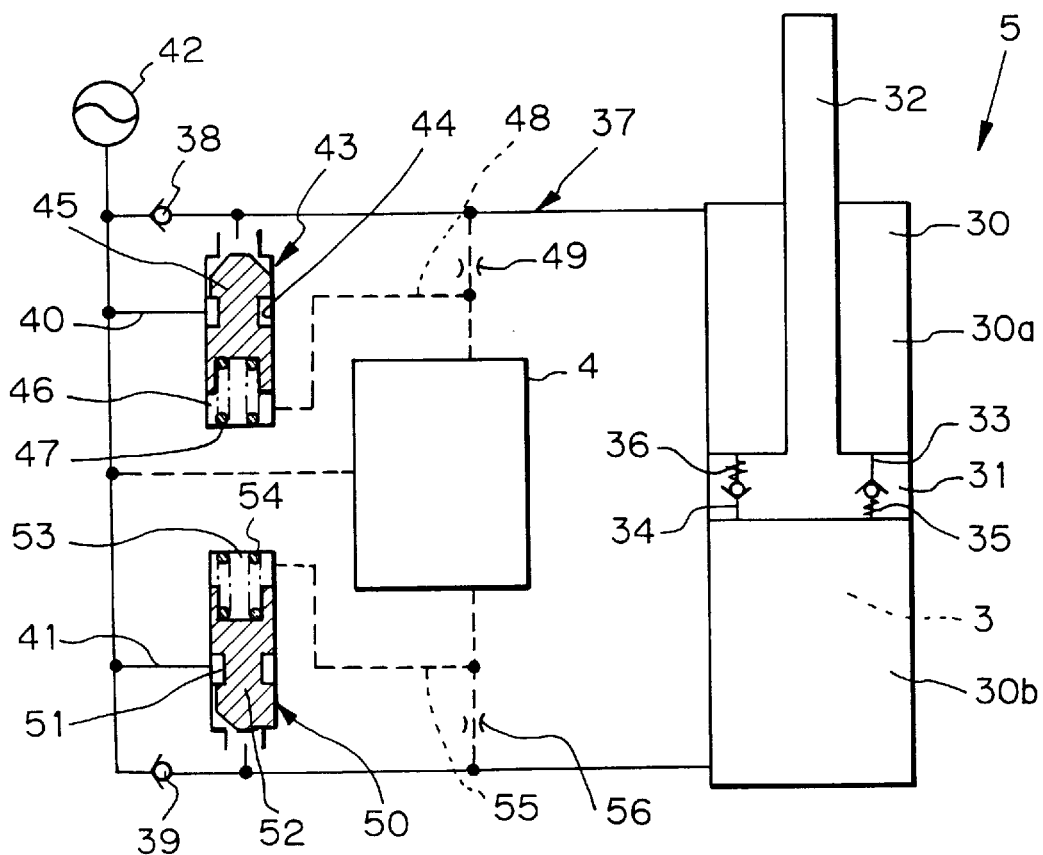
FIG. 2 is an illustration showing the shock absorber shown in FIG. 1 and a drive unit for the proportional solenoid valve shown in FIG. 1.

As shown in FIG. 2, the shock absorber 5 includes a cylinder 30 which has a piston 31 slidably fitted therein and is fixed to either a wheel support structure (not shown) or the vehicle body (not shown). The hydraulic fluid 3 is sealably contained in the cylinder 30. The piston 31 divides the inside of the cylinder 30 into two chambers, namely, a cylinder upper chamber 30a and a cylinder lower chamber 30b. The piston 31 is connected to one end of a piston rod 32. The other end of the piston rod 32 passes through a rod guide and a seal member (not shown) provided at an end portion of the cylinder 30 and extends to the outside of the cylinder 30, and is fixed to the other of the wheel support structure and the vehicle body.

An extension stroke passage 33 and a compression stroke passage 34 are formed in the piston 31 so that the cylinder upper chamber 30a and the cylinder lower chamber 30b communicate with each other. The extension stroke passage 33 has provided therein a pressure-regulating valve 35, such as a disk valve. When a hydraulic pressure in the cylinder upper chamber 30a exceeds a predetermined level, the pressure-regulating valve 35 allows a flow of hydraulic fluid from the cylinder upper chamber 30a to the cylinder lower chamber 30b, to thereby generate a damping force. The compression stroke passage 34 has provided therein a pressure-regulating valve 36, such as a disk valve. When a hydraulic pressure in the cylinder lower chamber 30b exceeds a predetermined level, the pressure-regulating valve 36 allows a flow of hydraulic fluid from the cylinder lower chamber 30b to the cylinder upper chamber 30a, to thereby generate a damping force.

A communicating passage 37 is provided outside the cylinder 30 so that the cylinder upper chamber 30a and the cylinder lower chamber 30b communicate with each other. The communicating passage 37 has provided therein a check valve 38 for preventing only a flow of hydraulic fluid from the cylinder upper chamber 30a to the cylinder lower chamber 30b and a check valve 39 for preventing only a flow of hydraulic fluid from the cylinder lower chamber 30b to the cylinder upper chamber 30a. The communicating passage 37 is connected to an extension stroke communicating passage 40 which bypasses the check valve 38 and a compression stroke communicating passage 41 which bypasses the check valve 39. The communicating passage 37 is also connected to a reservoir (accumulator) 42 in which a gas is sealably contained. A volumetric change in the cylinder 30 due to extension and compression strokes of the piston rod 32 is compensated for by compression and expansion of the gas contained in the reservoir 42.

The extension stroke communicating passage 40 has provided therein a poppet valve 43 for controlling a flow path area of the extension stroke communicating passage 40. The poppet valve 43 comprises a guide 44 and a poppet 45 as a valve body slidably fitted in the guide 44. The flow path area of the extension stroke communicating passage 40 is controlled by moving the poppet 45. The poppet 45 receives a hydraulic pressure on an upstream side thereof (on the side of the cylinder upper chamber 30a) in the extension stroke communicating passage 40 and moves in a direction for opening the poppet valve 43. A back-pressure chamber 46 is provided at the back of the poppet 45 in the guide 44 so that a hydraulic pressure in the back-pressure chamber 46 acts on the poppet 45 in a direction for closing the poppet valve 43. A spring 47 provided in the back-pressure chamber 46 biases the poppet 45 in a direction for closing the poppet valve 43.

The back-pressure chamber 46 is communicated through a back-pressure passage 48 with the communicating passage 37 on an upstream side of the poppet valve 43 in the extension stroke communicating passage 40 (on the side of the cylinder upper chamber 30a). The back-pressure passage 48 has an orifice 49.

The compression stroke communicating passage 41 has provided therein a poppet valve 50 for controlling a flow path area of the compression stroke communicating passage 41. The poppet valve 50 comprises a guide 51 and a poppet 52 as a valve body slidably fitted in the guide 51. The flow path area of the compression stroke communicating passage 41 is controlled by moving the poppet 52. The poppet 52 receives a hydraulic pressure on an upstream side thereof (on the side of the cylinder lower chamber 30b) in the compression stroke communicating passage 41 and moves in a direction for opening the poppet valve 50. A back-pressure chamber 53 is provided at the back of the poppet 52 in the guide 51 so that a hydraulic pressure in the back-pressure chamber 53 acts on the poppet 52 in a direction for closing the poppet valve 50. A spring 54 provided in the back-pressure chamber 53 biases the poppet 52 in a direction for closing the poppet valve 50.

The back-pressure chamber 53 is communicated through a back-pressure passage 55 with the communicating passage 37 on an upstream side of the poppet valve 50 in the compression stroke communicating passage 41 (on the side of the cylinder lower chamber 30b). The back-pressure passage 55 has an orifice 56.

Figure 3:
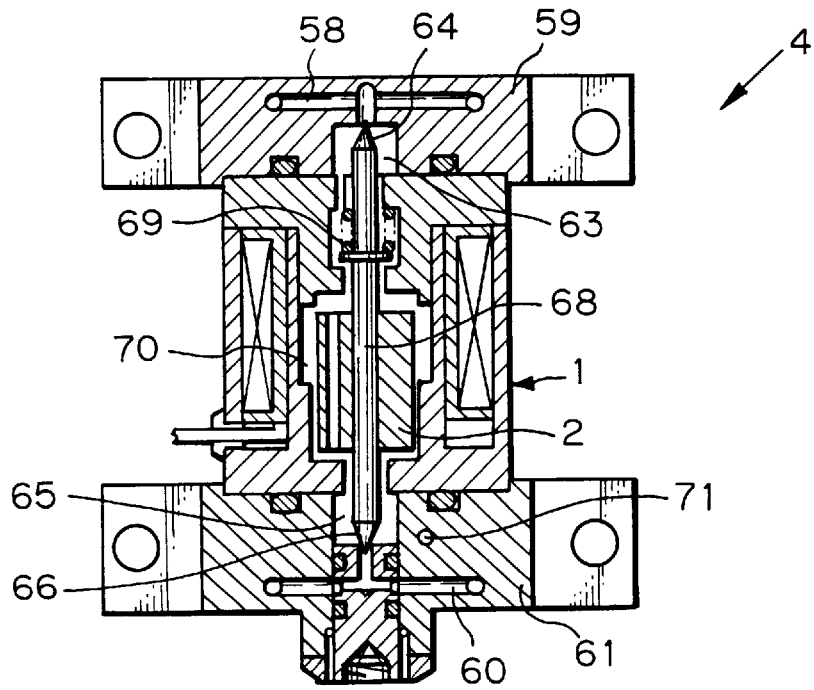
FIG. 3 is a cross-sectional view of the proportional solenoid valve shown in FIG. 2.

The proportional solenoid valve 4 is provided so as to communicate with each of the back-pressure passages 48 and 55. As shown in FIG. 3, the proportional solenoid valve 4 mainly comprises: a relief valve 59 for relieving a hydraulic pressure in a back-pressure passage 58 connected to the poppet valve 43; a relief valve 61 for relieving a hydraulic pressure in a back-pressure passage 60 connected to the poppet valve 50; and the solenoid 1 for opening and closing the relief valves 59 and 61.

The relief valve 59 is a needle valve in which a passage between the back-pressure passage 58 and a relief chamber 63 is opened and closed by a needle 64. The relief valve 61 is a needle valve in which a passage between the back-pressure passage 60 and a relief chamber 65 is opened and closed by a needle 66. The needles 64 and 66 are provided on both ends of a rod 68 connected to the plunger 2 provided in the solenoid 1. The relief valves 59 and 61 are opened and closed by moving the rod 68. When one valve of the relief valves 59 and 61 is opened, the other valve is closed.

The solenoid 1 has a spring 69 which biases the rod 68 toward the relief valve 61. In a normal state, the relief valve 61 is closed and the relief valve 59 is open. The solenoid 1 is adapted to generate a force in a direction such that the plunger 2 moves the rod 68 toward the relief valve 59 against the biasing force of the spring 69, according to the intensity of the current applied to the solenoid 1. Thus, the relief pressure of the relief valve 61 can be controlled according to the intensity of the current applied to the solenoid 1. When the intensity of the current applied to the solenoid 1 becomes large, the rod 68 is substantially moved toward the relief valve 59, so that the relief pressure of the relief valve 59 can be controlled.

The relief chambers 63 and 65 communicate with each other through a passage 70 in the solenoid 1 and also communicate with the reservoir 42 through a relief passage 71 formed in the relief valve 61.

In the proportional solenoid valve 4, when the relief pressure of the relief valve 61 is changed according to the intensity of the current applied to the solenoid 1, the degree of opening of the poppet valve 50 is also changed, to thereby control a damping force for a compression stroke. In this instance, the relief valve 59 is open, so that the degree of opening of the poppet valve 43 is large and hence, a damping force for an extension stroke is small. When the intensity of the current applied to the solenoid 1 is increased to thereby substantially move the rod 68 toward the relief valve 59, the relief pressure of the relief valve 59 is changed, so that the degree of opening of the poppet valve 43 is also changed, to thereby control a damping force for an extension stroke. In this instance, the relief valve 61 is open, so that the degree of opening of the poppet valve 50 is large and hence, a damping force for a compression stroke is small.

Referring back to FIG. 1, the controller 8 comprises a transistor (switching means) 9 provided between the solenoid 1 and the battery 7, a transistor (switching means) 11 connected to a base 9a of the transistor 9 through a resistor 10, and a CPU 14 connected to the transistor 11 through a resistor 13 and also connected to the acceleration sensor 6.

Figure 7:
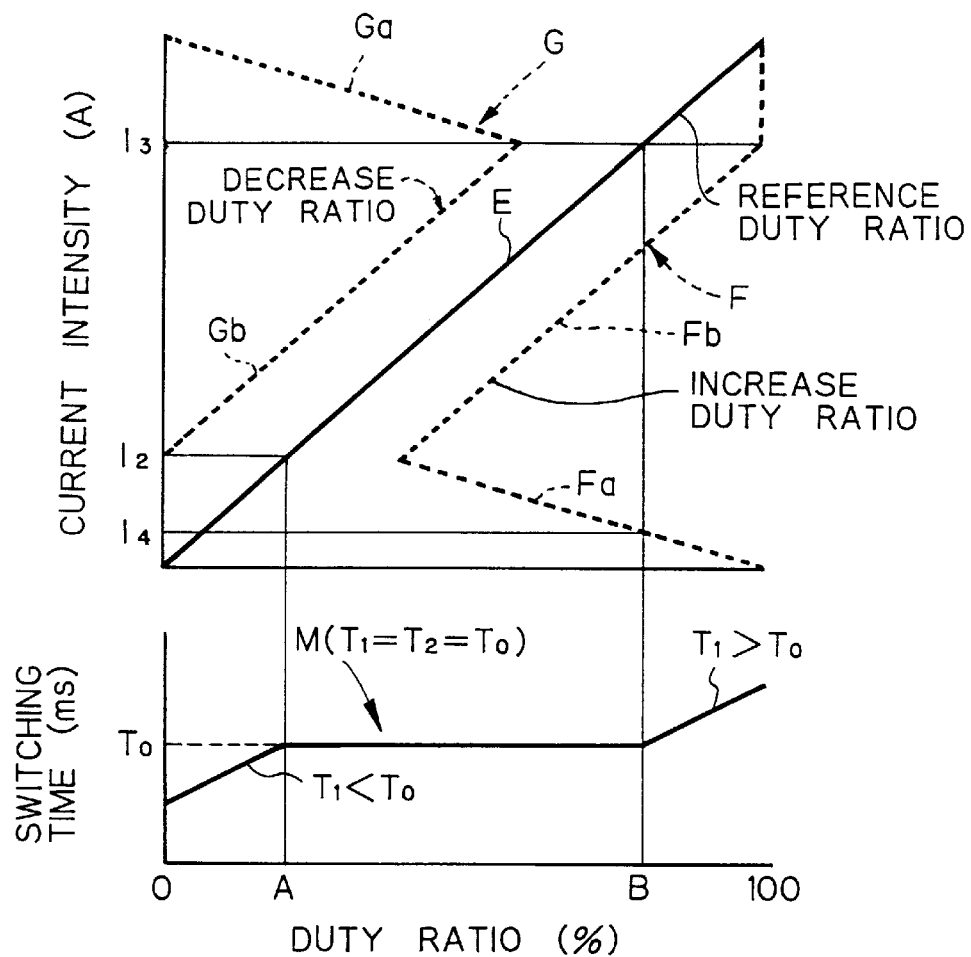
FIG. 7 shows a PWM duty ratio—current intensity and switching time map which is stored in a memory in the CPU shown in FIG. 1.

The CPU 14 has a memory (not shown) storing a PWM duty ratio—current intensity and switching time map shown in FIG. 7. The CPU 14 determines the average intensity of the current to be applied to the solenoid 1 and the reference duty ratio, based on the detection value of the acceleration sensor 6, and conducts calculations in a manner as mentioned below, to thereby maintain the dither amplitude at a predetermined level, regardless of the average intensity of the current applied to the solenoid 1. In this embodiment of the present invention, the CPU 14 constitutes PWM signal generating means.

Hereinbelow, explanation is made on the PWM duty ratio—current intensity and switching time map of FIG. 7. In an upper graph of FIG. 7 in which the abscissa indicates the PWM duty ratio and the ordinate indicates the average intensity of the applied current (the intensity of the target current), the reference duty ratio characteristic line E indicates that the reference duty ratio is in direct proportion to the average intensity of the applied current. A reference duty ratio A % corresponds to an average intensity $I_2$ of the applied current, and a reference duty ratio B % corresponds to an average intensity $I_3$ of the applied current. When the average intensity of the applied current is in a range of from $I_2$ to $I_3$, the increase duty ratio characteristic line F and the decrease duty ratio characteristic line G are parallel to the reference duty ratio characteristic line E. As shown in a lower graph of FIG. 7, when the average intensity of the applied current is in a range of from $I_2$ to $I_3$ (i.e., when the reference duty ratio is in a range M of from A % to B %), a time period $T_1$ during which the PWM signal having the increase duty ratio is outputted (hereinafter, frequently referred to simply as "increase switching time $T_1$") is set to a time period $T_0$ which is equal to ½ of a cycle time of a dither. [Accordingly, a time period $T_2$ during which the PWM signal having the decrease duty ratio is outputted (hereinafter, frequently referred to simply as "decrease switching time $T_2$") is also set to the time period $T_0$ which is equal to ½ of a cycle time of a dither.]

When the average intensity of the applied current is less than $I_2$ (when the decrease duty ratio is 0%), the increase switching time $T_1$ is set as being shorter than the time period $T_0$ (which is equal to ½ of a cycle time of a dither). (Accordingly, the decrease switching time $T_2$ is longer than the time period $T_0$.) Thus, the ratio between the time period during which the PWM signal having the increase duty ratio is outputted and the time period during which the PWM signal having the decrease duty ratio is outputted changes. With respect to the increase duty ratio characteristic line F, in a range $F_a$ where the average intensity of the applied current is less than $I_2$, the gradient of the increase duty ratio characteristic line F is opposite to the gradient $I_1$ the increase duty ratio characteristic line F in a range $F_b$ where the average intensity of the applied current is from $I_2$ to $I_3$ (when the gradient of the increase duty ratio characteristic line F in the range $F_b$ is positive, the gradient of the increase duty ratio characteristic line F in the range $F_a$ is negative). That is, in the range $F_a$ where the average intensity of the applied current is less than $I_2$, as the average intensity of the applied current becomes low, the increase duty ratio becomes large.

When the average intensity of the applied current is more than $I_3$ (when the increase duty ratio is 100%), the increase switching time $T_1$ is set as being longer than the time period $T_0$ (which is equal to ½ of a cycle time of a dither). (Accordingly, the decrease switching time $T_2$ is shorter than the time period $T_0$.) With respect to the decrease duty ratio characteristic line G, in a range $G_a$ where the average intensity of the applied current is more than $I_3$, the gradient of the decrease duty ratio characteristic line G is opposite to the gradient of the decrease duty ratio characteristic line G in a range $G_b$ where the average intensity of the applied current is from $I_2$ to $I_3$ (when the gradient of the decrease duty ratio characteristic line G in the range $G_b$ is positive, the gradient of the decrease duty ratio characteristic line G in the range $G_a$ is negative). That is, in the range $G_a$ where the average intensity of the applied current is more than $I_3$, as the average intensity of the applied current becomes high, the decrease duty ratio becomes small.

The operation of the suspension control apparatus arranged as mentioned above is explained below, together with contents of calculations by the controller.

When vibration of the vehicle body is transmitted to the acceleration sensor 6, the acceleration sensor 6 detects the acceleration of the vehicle body in a vertical direction. The detection value of acceleration is inputted to the CPU 14 in real time.

Figure 4:
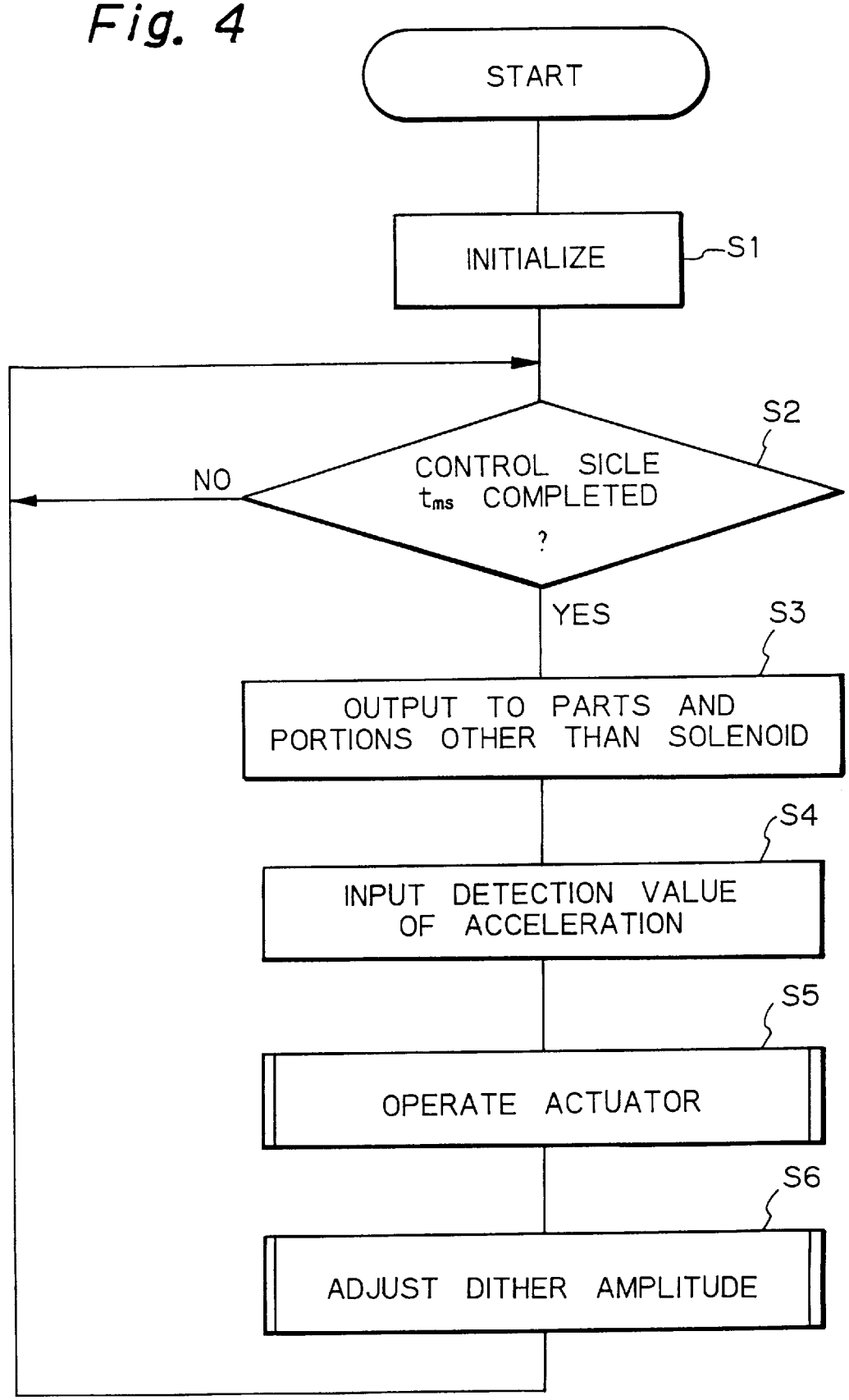
FIG. 4 is a flow chart: showing a main routine of the controller in the suspension control apparatus of FIG. 1.

The CPU 14 conducts calculations indicated in a flow chart of FIG. 4, based on the detection value of acceleration, to thereby determine a target damping force to be generated by the shock absorber 5 and a target current having an intensity corresponding to the target damping force.

Hereinbelow, explanation is made on the flow chart of FIG. 4.

When power is transmitted from the battery 7 to the controller 8, the controller 8 first effects initialization (step S1), and whether or not a damping force control cycle $t_{ms}$ is completed is judged (step S2). When the damping force control cycle $t_{ms}$ is not completed, the above-mentioned judging step S2 is repeated. When the damping force control cycle $t_{ms}$ is completed, the controller 8 applies signals to various parts and portions [such as an LED (light emitting diode)] of the suspension control apparatus other than the solenoid 1 (transistor 11)(step S3).

At a step S4, the detection value of acceleration of the acceleration sensor 6 is inputted to the CPU 14. At a step S5, a target damping force required for damping vibration of the vehicle body and a target current having an intensity (equal to the average intensity of the applied current) which is necessary for generating the target damping force are determined, based on the detection value of acceleration inputted to the CPU 14 at the step S4. Further, at the step 5, the PWM signal is outputted according to the duty ratios (reference duty ratio, and increase and decrease duty ratios) determined at a step S6 in a preceding damping force control cycle, thereby operating the proportional solenoid valve 4 (a subroutine for driving an actuator). The subroutine for driving an actuator (shown in FIG. 5) is conducted independently from the flow chart (main routine) of FIG. 4, by an interruption at predetermined time intervals, each being equal to ½ of a cycle time of a dither. The contents of this subroutine are explained later.

At the step S6 subsequent to the above-mentioned step S5, as explained later, through the interruption the switching time of the PWM duty ratio is adjusted, based on the intensity of the target current (the average intensity of the applied current) determined at the step S5 and the PWM duty ratio—current intensity and switching time map of FIG. 7, to thereby adjust the dither amplitude (a subroutine for adjusting a dither amplitude).

The subroutine for driving an actuator at the step S5 is explained below, with reference to FIG. 5.

Figure 5:
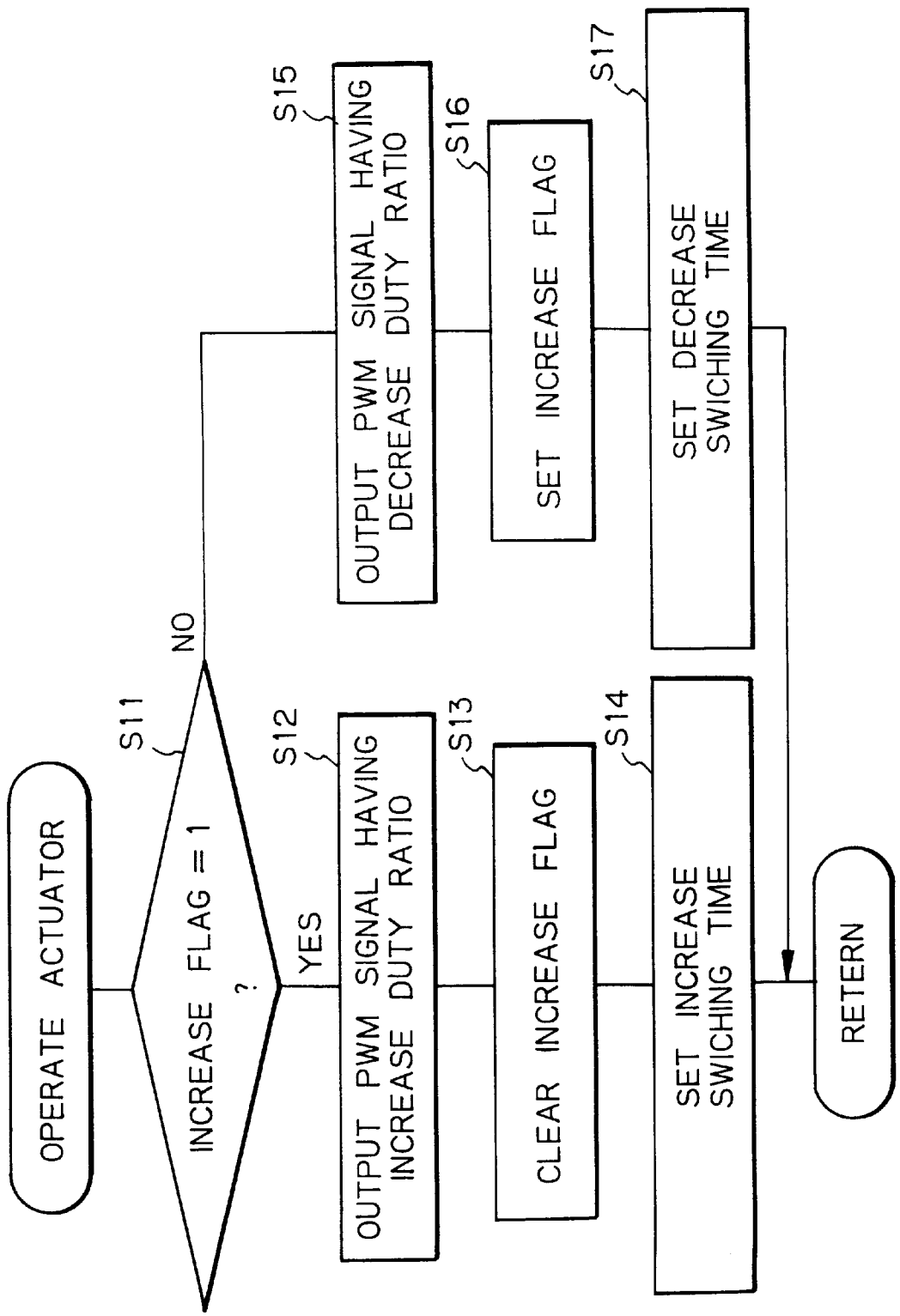
FIG. 5 is a flow chart showing the subroutine for driving an actuator in the flow chart of FIG. 4.

As shown in FIG. 5, it is judged whether or not an increase flag is 1 (step S11). When the increase flag is 1, the PWM signal having the increase duty ratio which has been determined at the step S6 in the preceding damping force control cycle is outputted (step S12), and the increase flag is cleared (step S13). Thereafter, a time to the next interruption (increase switching time $T_1$), is set (step S14), and the control returns to the main routine.

On the other hand, at the step S11, when the increase flag is not 1, the PWM signal having the decrease duty ratio is outputted (step S15), and the increase flag is set (step S16). Thereafter, a time to the next interruption (decrease switching time $T_2$), is set (step S17), and the control returns to the main routine.

Figure 6:
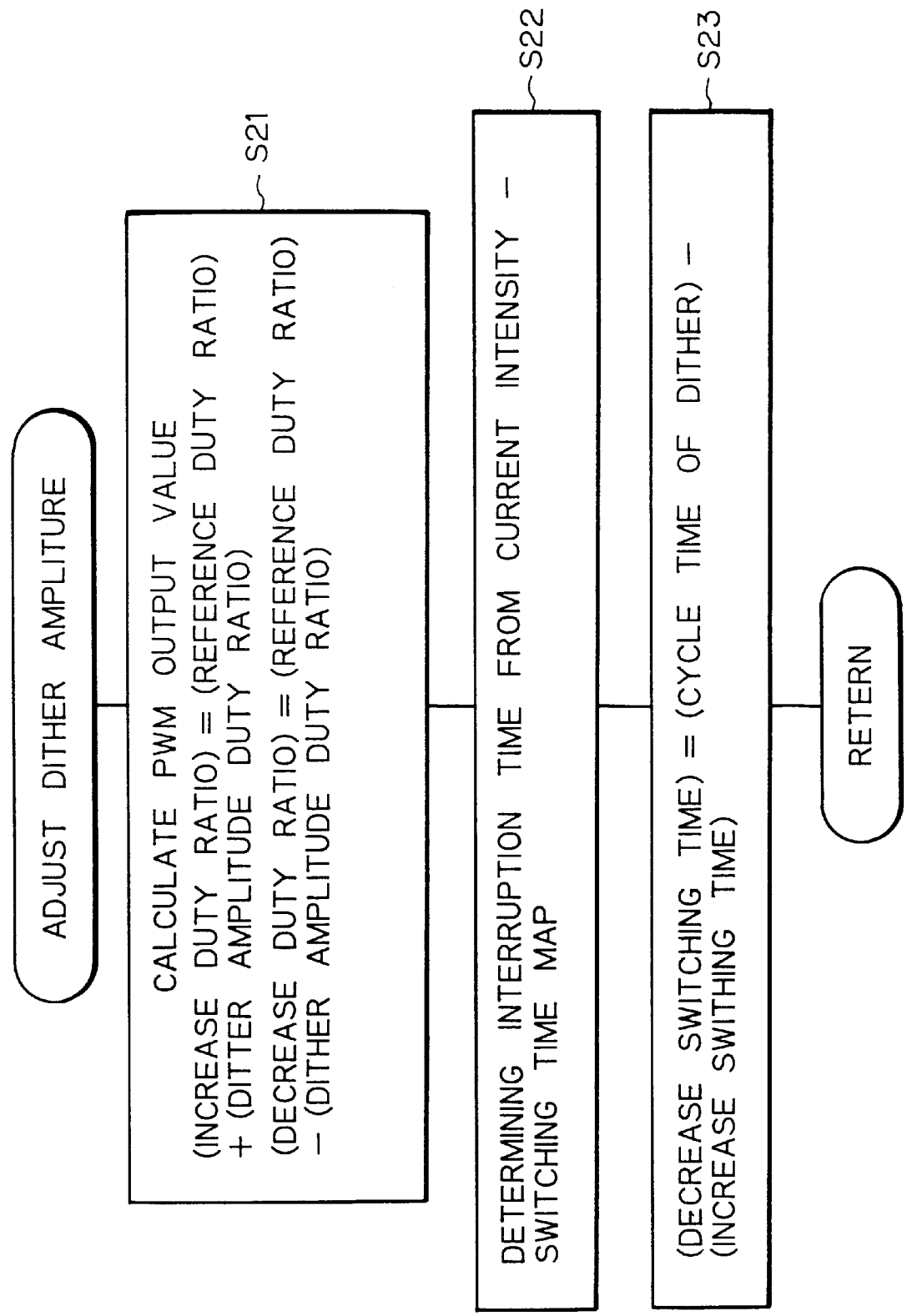
FIG. 6 is a flow chart showing the subroutine for adjusting a dither amplitude in the flow chart of FIG. 4.

Next, the subroutine for adjusting a dither amplitude at the step S6 is explained, with reference to FIG. 6.

Based on the intensity of the target current (the average intensity of the applied current) determined at the step S5, the reference duty ratio and the dither amplitude duty ratio are determined from the map of FIG. 7, and the increase duty ratio and decrease duty ratio are determined from the reference duty ratio and the dither amplitude duty ratio, in accordance with the above-mentioned formulae (1) and (2) (step S21).

At a step S22, the increase switching time (i.e., interruption interval) $T_1$ during which the PWM signal having the increase duty ratio is outputted is determined from the map of FIG. 7, based on the reference duty ratio determined at the step S21. At a step S23, the decrease switching time $T_2$ during which the PWM signal having the decrease duty ratio is outputted is determined by subtracting the increase switching time $T_1$ from a cycle time of a dither.

At the step S22, when the average intensity of the applied current is in a range of from $I_2$ to $I_3$, the increase switching time $T_1$ is determined as the time period $T_0$ which is equal to ½ of a cycle time of a dither. Consequently, at the step S23, when the average intensity of the applied current is in a range of from $I_2$ to $I_3$, the decrease switching time $T_2$ is determined as the time period $T_0$.

Figure 8:
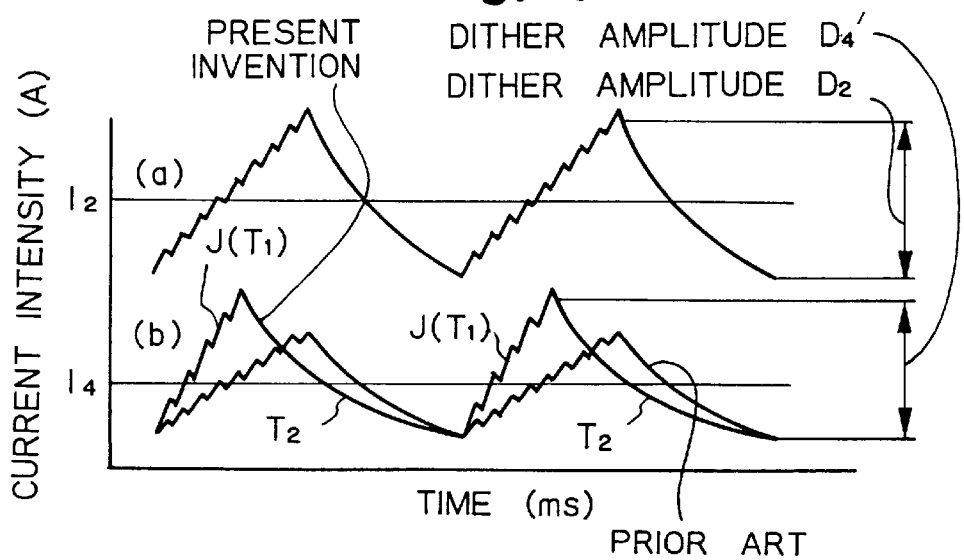
FIG. 8 shows a dither amplitude controlled by the suspension control apparatus of FIG. 1 in comparison with a dither amplitude controlled by a conventional suspension control apparatus.
Figure 9:
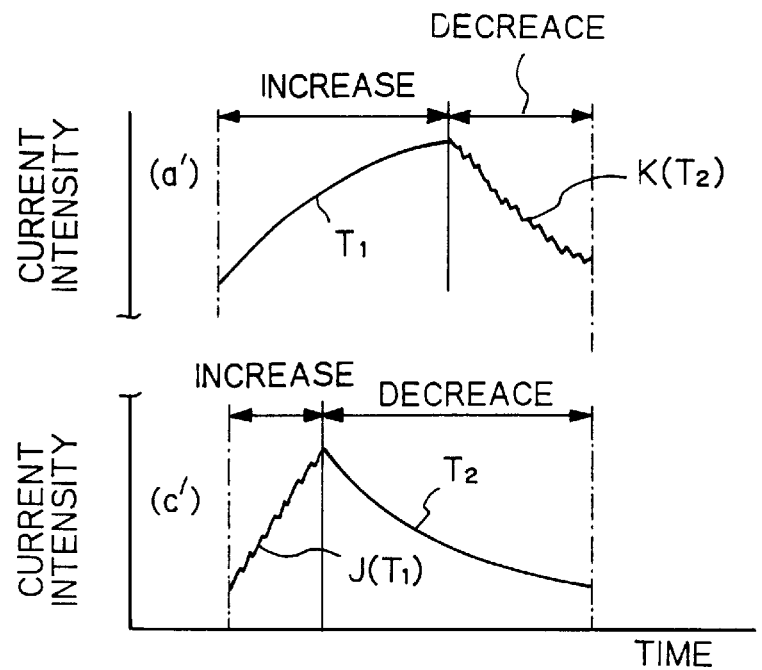
FIG. 9 shows the waveforms of applied currents obtained by the suspension control apparatus of FIG. 1, each including a dithering current.

When the average intensity of the applied current is less than $I_2$ (when the decrease duty ratio is 0%), the interrption time is adjusted so that the increase switching time $T_1$ becomes shorter than the time period $T_0$. (Accordingly, the decrease switching time $T_2$ becomes longer than the time period $T_0$.) As mentioned above, when the average intensity of the applied current is less than $I_2$ (when the decrease duty ratio is 0%), the increase duty ratio becomes large as the average intensity of the applied current becomes low. In this instance, the applied current has a form as indicated by, for example, a current waveform (b) in a graph of FIG. 8 and a current waveform (c') in a graph of FIG. 9. In an increasing portion J of each of the current waveforms (b) and (c'), an increase in the intensity of the applied current occurs at a high rate due to the large increase duty ratio, so that a sufficiently large increase in the intensity of the applied current for maintaining the dither amplitude at a predetermined level can be obtained in a short period of time. On the other hand, in a decreasing portion of each of the current waveforms (b) and (c'), although a decrease in the intensity of the applied current occurs gradually, the decrease switching time $T_2$ is prolonged so that a sufficiently large decrease in the intensity of the applied current for maintaining the dither amplitude at a predetermined level can be obtained. Thus, even when the average intensity of the applied current is less than $I_2$ (the decrease duty ratio is 0%), the dither amplitude can be maintained at a predetermined level. In the graph of FIG. 8, a current waveform (a) represents the applied current having an average intensity $I_2$.

When the average intensity of the applied current is more than $I_3$ (when the increase duty ratio is 100%), the interruption time is adjusted so that the increase switching time $T_1$ becomes longer than the time period $T_0$. (Accordingly, the decrease switching time $T_2$ becomes shorter than the time period $T_0$.) As mentioned above, when the average intensity of the applied current is more than $I_3$ (when the increase duty ratio is 100%), the decrease duty ratio becomes small as the average intensity of the applied current becomes high. In this instance, the applied current has a form as indicated by, for example, a current waveform (a') in the graph of FIG. 9. In a decreasing portion K of the current waveform (a'), a decrease in the intensity of the applied current occurs at a high rate due to the small decrease duty ratio, so that a sufficiently large decrease in the intensity of the applied current for maintaining the dither amplitude at a predetermined level can be obtained in a short period of time. On the other hand, in an increasing portion of the current waveform (a'), although an increase in the intensity of the applied current occurs gradually, the increase switching time $T_1$ is prolonged so that a sufficiently large increase in the intensity of the applied current for maintaining the dither amplitude at a predetermined level can be obtained. Thus, even when the average intensity of the applied current is more than $I_3$ (the increase duty ratio is 100%), the dither amplitude can be maintained at a predetermined level.

As has been described above, in the suspension control apparatus of the present invention utilizing a PWM type proportional solenoid valve, in which a current in a form such that a dithering current is superimposed on a target current is applied to a solenoid, a variable damping force is generated, which varies according to an average intensity of the applied current (intensity of the target current) which is determined, based on an acceleration of a vehicle body in a vertical direction detected by an acceleration sensor. Therefore, damping of vibration of the vehicle body can be satisfactorily effected.

Further, in the suspension control apparatus of the present invention, the increase switching time and the decrease switching time are adjusted to thereby maintain the dither amplitude at a predetermined level, regardless of the average intensity of the applied current. Therefore, even when the average intensity of the applied current varies in a wide range, that is, even when the damping force varies in a wide range, an undesirable increase in hysteresis with respect to a damping force can be suppressed, to thereby ensure good responsivity for controlling a damping force.

The suspension control apparatus of the present invention is especially advantageous when the average intensity of the applied current varies in a wide range, that is, when the damping force varies in a wide range. In the suspension control apparatus of the present invention, the dither amplitude is substantially maintained at a predetermined level, regardless of the average intensity of the applied current, by adjusting a ratio between a time period during which the PWM signal having an increase duty ratio is outputted and a time period during which the PWM signal having a decrease duty ratio is outputted, so that an undesirable increase in hysteresis with respect to a damping force can be suppressed, to thereby ensure good responsivity of the PWM type proportional solenoid valve.

What is claimed is:

1. A suspension control apparatus comprising:
    a proportional solenoid valve having a solenoid and a movable member,
    said movable member being adapted to be displaced according to an intensity of a current applied to said solenoid;
    PWM signal generating means for generating a PWM signal having a variable duty ratio,
    said PWM signal being adapted to be switched between two duty ratios,
    the PWM signal having one of said two duty ratios and the PWM signal having the other duty ratio being applied during respective predetermined time periods, to thereby obtain a dithering current to be superimposed on a predetermined target current,
    said dithering current and said target current constituting said current applied to the solenoid,
    said PWM signal generating means including means for changing the ratio between said time period during which the PWM signal having one of said two duty ratios is applied and said time period during which the PWM signal having the other duty ratio is applied, in a manner such that an amplitude of said dithering current is substantially maintained at a predetermined level; and
    switching means provided between a power source and said solenoid to be switched on and off according to said PWM signal.

2. A suspension control apparatus according to claim 1, wherein said PWM signal generating means has a map determining a relationship between said duty ratio of the PWM signal and said intensity of the current applied to the solenoid,
    said map including a reference duty ratio characteristic line, a decrease duty ratio characteristic line and an increase duty ratio characteristic line,
    said two duty ratios being a decrease duty ratio and an increase duty ratio determined by said decrease duty ratio characteristic line and said increase duty ratio characteristic line, respectively,
    said decrease duty ratio characteristic line including a straight line portion indicating that the decrease duty ratio is 0% in a first current intensity range where the intensity of the current applied to the solenoid is lower than a first predetermined value, and wherein in said first current intensity range, said PWM signal generating means changes a time period during which the PWM signal having the decrease duty ratio is applied, in inverse proportion to a difference in duty ratio between said reference duty ratio characteristic line and said decrease duty ratio characteristic line.

3. A suspension control apparatus according to claim 2, wherein said increase duty ratio characteristic line includes a straight line portion indicating that the increase duty ratio is 100% in a second current intensity range where the intensity of the current applied to the solenoid is higher than a second predetermined value and wherein in said second current intensity range, said PWM signal generating means changes a time period during which the PWM signal having the increase duty ratio is applied, in inverse proportion to a difference in duty ratio between said reference duty ratio characteristic line and said increase duty ratio characteristic line.

4. A suspension control apparatus according to claim 3, wherein said decrease duty ratio characteristic line includes a straight line portion indicating that the decrease duty ratio becomes small as the intensity of the current applied to the solenoid becomes high and said increase duty ratio characteristic line includes a straight line portion indicating that the increase duty ratio becomes large as the intensity of the current applied to the solenoid becomes low and wherein in said first current intensity range, said PWM signal generating means changes the time period during which the PWM signal having the increase duty ratio is applied, in inverse proportion to the difference in duty ratio between said reference duty ratio characteristic line and said increase duty ratio characteristic line and in said second current intensity range, the PWM signal generating means changes the time period during which the PWM signal having the decrease duty ratio is applied, in inverse proportion to the difference in duty ratio between said reference duty ratio characteristic line and said decrease duty ratio characteristic line.

5. A method for controlling a dithering current in a suspension control apparatus comprising: a proportional solenoid valve having a solenoid and a movable member adapted to be displaced according to an intensity of a current applied to said solenoid; PWM signal generating means for generating a PWM signal having a variable duty ratio; and switching means provided between a power source and said solenoid to be switched on and off according to said PWM signal, said method comprising: changing the PWM signal to be switched between a decrease duty ratio and an increase duty ratio, so that the PWM signal having said decrease duty ratio and the PWM signal having said increase duty ratio are applied during a decrease switching time and an increase switching time, respectively, to thereby obtain a dithering current to be superimposed on a predetermined target current, said dithering current and said target current constituting said current applied to the solenoid; and also changing the PWM signal in such a manner that in a first current intensity range where said decrease duty ratio is 0%, said decrease switching time is prolonged and said increase switching time is determined so that the total of said prolonged decrease switching time and said increase switching time is substantially constant, said increase duty ratio being determined so that an amplitude of said dithering current obtained by application of the PWM signal having the decrease duty ratio and an amplitude of said dithering current obtained by application of the PWM signal having the increase duty ratio are substantially the same.

6. A method according to claim 5, wherein in a second current intensity range where said increase duty ratio is 100%, said increase switching time is prolonged and said decrease switching time is determined so that the total of said prolonged increase switching time and said decrease switching time is substantially constant, said decrease duty ratio being determined so that the amplitude of said dithering current obtained by application of the PWM duty ratio having the increase duty ratio and the amplitude of said dithering current obtained by application of the PWM duty ratio having the decrease duty ratio are substantially the same.

* * * * *